Jan. 8, 1957     C. R. SIMMONS ET AL     2,776,643
NESTING BOX
Filed March 9, 1953     3 Sheets-Sheet 1
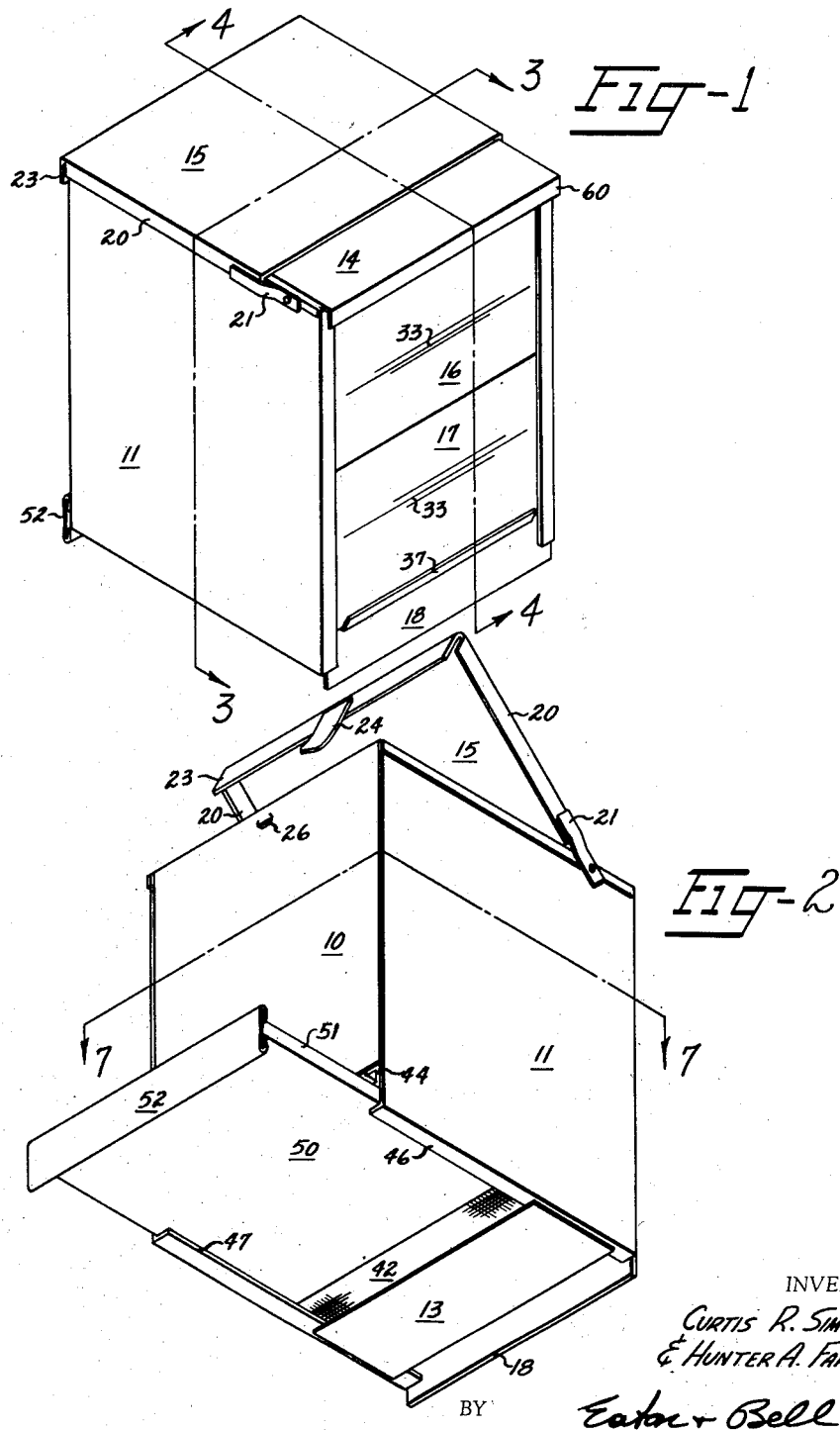
INVENTORS:
CURTIS R. SIMMONS
& HUNTER A. FARROW
BY Eaton & Bell
ATTORNEYS.

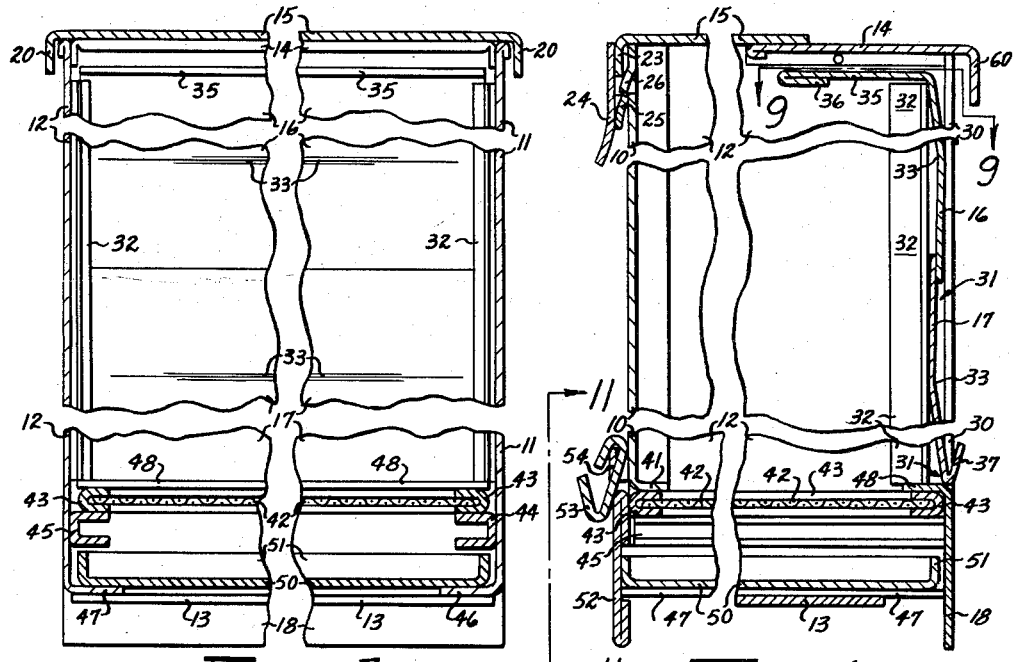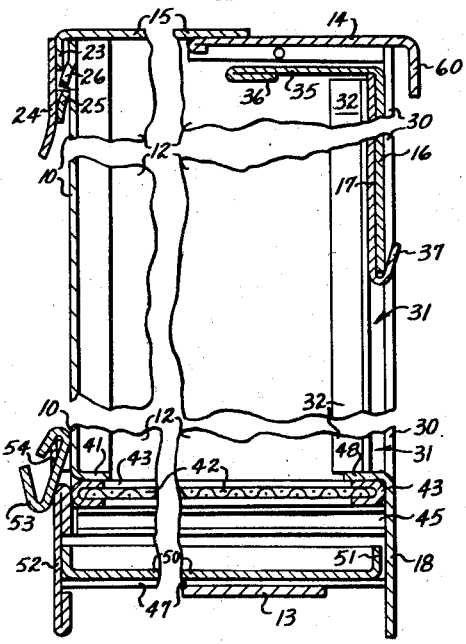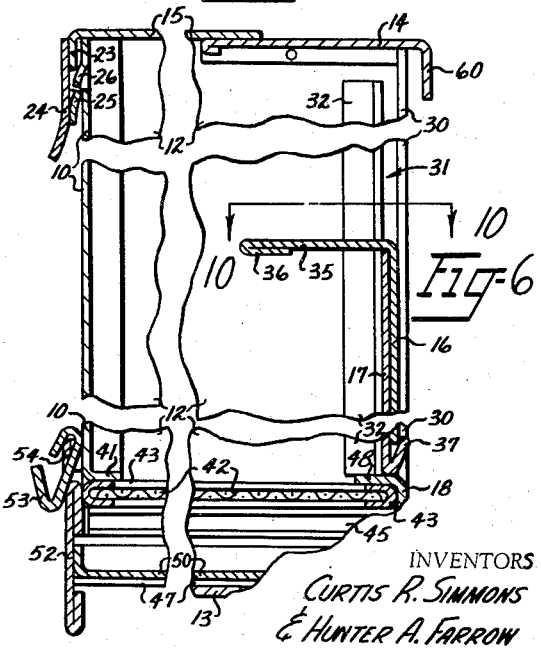

Jan. 8, 1957   C. R. SIMMONS ET AL   2,776,643
NESTING BOX
Filed March 9, 1953   3 Sheets-Sheet 3
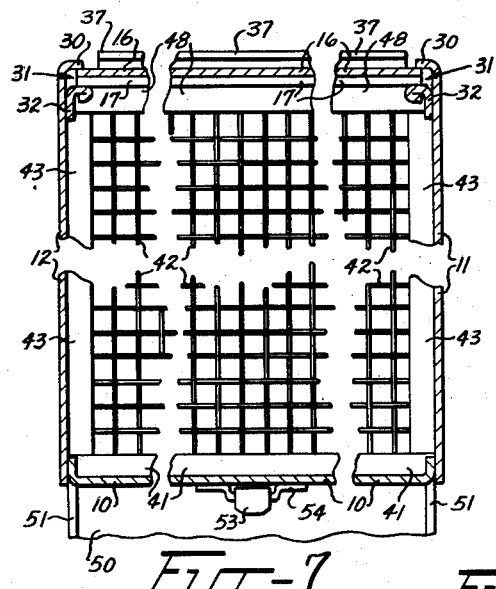
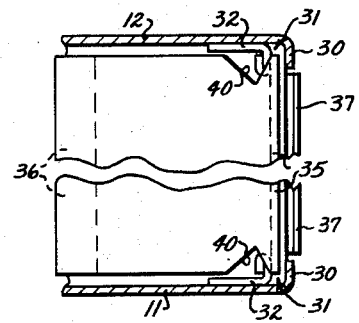
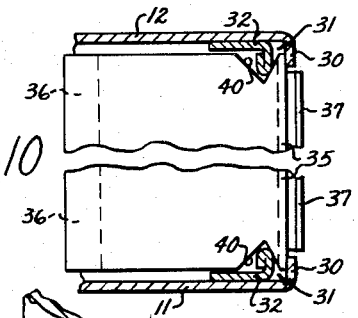
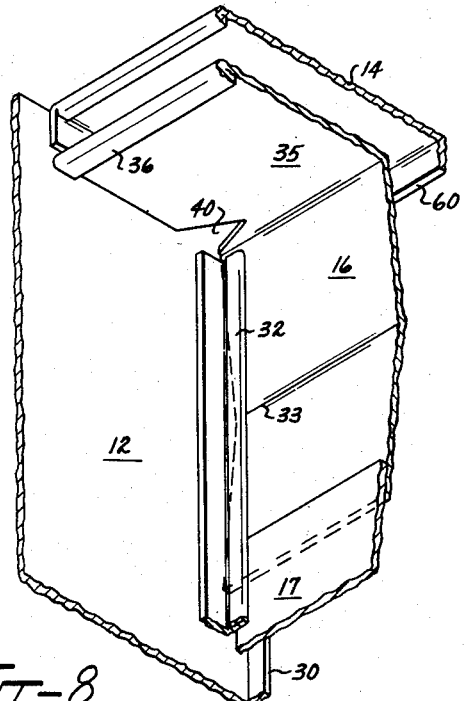
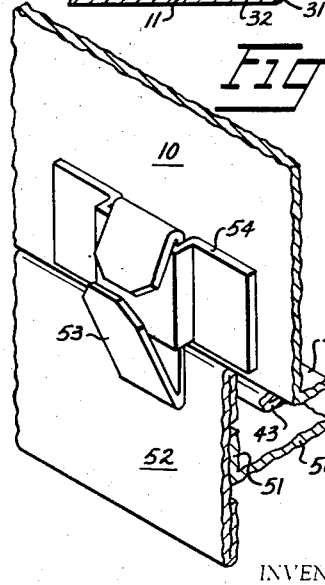
INVENTORS:
CURTIS R. SIMMONS
& HUNTER A. FARROW
BY
Eaton & Bell
ATTORNEYS.

United States Patent Office 2,776,643
Patented Jan. 8, 1957

2,776,643
NESTING BOX

Curtis R. Simmons, Kannapolis, N. C., and Hunter A. Farrow, New Market, Va., assignors to Hunter Farrow Equipment, Inc., China Grove, N. C., a corporation of North Carolina Application March 9, 1953, Serial No. 340,949

6 Claims. (Cl. 119—45)

This invention relates to nesting boxes and more particularly to nesting boxes for relatively small timid animals such as chinchillas or the like. The nesting box is designed or adapted to be used in connection with an animal cage, which cage may be of a conventional type.

It is an object of this invention to provide a nesting box for an animal cage, said box having an opening communicating with the animal cage, and wherein means are provided for adjusting the size of said opening and for closing the same, as desired.

It is another object of this invention to provide a nesting box which is adapted to be detachably secured to an animal cage and which is provided with an opening communicating with the animal cage and wherein telescopic closure means are provided for said opening which are operable to partially or completely close the same, as desired.

It is another object of this invention to provide a nesting box of the type described wherein one wall thereof is formed of a pair of telescopic members slidably mounted in grooves on adjacent walls and wherein the telescopic members are so constructed as to frictionally engage the walls of said grooves at points throughout their length to cause said telescopic members to maintain a desired position and whereby said telescopic members may be manually adjusted to different positions.

It is another object of this invention to provide a nesting box adapted to be used in conjunction with an animal cage, which nesting box has a foraminated floor and a solid cleaning tray disposed therebeneath and spaced therefrom a sufficient distance to prevent possible injury to the feet of the animals within the nesting box as the cleaning tray is pulled out while cleaning the box.

Some of the objects of the invention having been stated, other objects will appear as the description proceeds, when taken in connection with the accompanying drawings in which—

Figure 1 is an isometric view looking downwardly at the rear of the nesting box and showing the telescopic closure members in closed position;

Figure 2 is an isometric view looking up at the bottom and front of the box and showing the cleaning tray in partially opened position, and the hinged top in partially raised position;

Figure 3 is an enlarged vertical sectional view taken substantially along the line 3—3 in Figure 1;

Figure 4 is an enlarged vertical sectional view taken substantially along the line 4—4 in Figure 1;

Figure 5 is a view similar to Figure 4, but showing the panels in the rear wall in raised position;

Figure 6 is a view similar to Figure 4, but showing the panels in the rear wall in lowered position;

Figure 7 is an enlarged sectional plan view taken substantially along the line 7—7 in Figure 2;

Figure 8 is an enlarged fragmentary isometric view looking upwardly within the box toward the upper rear portion thereof;

Figure 9 is an enlarged fragmentary sectional plan view taken along the line 9—9 in Figure 4;

Figure 10 is an enlarged fragmentary sectional plan view taken along the line 10—10 in Figure 6;

Figure 11 is an enlarged fragmentary isometric view showing the details of the sliding latch assembly adapted to hold the cleaning tray and floor in position.

Referring more specifically to the drawings, it will be observed that we have provided an improved nesting box having a front wall or panel 10, side walls or panels 11 and 12, a relatively narrow transversely extending bottom panel 13, which panel 13 is positioned rearwardly of the medial portion of the box and connects the side panels 11 and 12, a fixed top panel 14, and a hinged top 15. Telescopic closure means comprising vertically sliding panels 16 and 17, together with a fixed rear panel 18 form the rear of the box.

The front wall 10 is rigidly secured to the side walls 11 and 12 in right angular relation thereto by any suitable means, such as welding. The hinged top 15 has downwardly depending side flanges 20 to each of which one end of a hinge 21 is secured, the other ends of the hinges 21 being pivotally secured to the respective side walls 11 and 12. The top 15 has a downwardly depending front flange 23 with a centrally positioned inturned slotted portion 25 therein adapted to mate with an outturned slotted portion 26 in the front wall 10, a lifting member or latch 24 is secured to the flange 23 in juxtaposed relation to the slotted portion 25. This arrangement comprises an improved latching means.

The rearmost vertically extending edges of the side walls 11 and 12 are turned inwardly, as at 30, to form the outer legs of vertically extending U-shaped guide channels 31, the webs of said channels being formed by the rearmost portions of respective side walls 11 and 12 and the inner legs of said channels 31 being formed by outturned portions of vertically extending L-shaped flanges 32, one leg of each of which is secured to the inner surfaces of respective side walls 11 and 12 in spaced relation to the flange 30. It will be noted in Figures 4, 5 and 6 that the uppermost ends of the flange members 32 are spaced a substantial distance beneath the uppermost ends of the side walls 11 and 12 respectively.

The channels 31, thus formed, are provided for the reception of the vertically slidable panels 16 and 17, each of said panels being of a height slightly more than half the distance between the rigid top panel 14 and the upper end of the rear panel 18 and each of said panels 16 and 17 being formed from any suitable material having inherent spring-like or resilient qualities, such as sheet metal or the like. The medial portion of each of the panels 16 and 17 is bent transversely as at 33 so that the panels will flex against opposite legs 30 and 32 of the channel 31, thus enabling each of the panels 16 and 17 to be held in a desired position.

The upper portion of the panel 16 is bent inwardly within the nesting box at substantially right angles to the vertical portion of the panel 16 so as to form a flange 35, and the flange 35 extends a substantial distance toward the front of the nesting box and the front edge thereof is bent back upon itself, as at 36, so as to form a smooth rounded front portion. The lower edge of the panel 17 is bent outwardly and then upwardly, as at 37, to form a groove.

It will be observed in Figure 4 that the panels 16 and 17 are so positioned within the channel 31 that the lower edge of the top panel 16 is placed outwardly from and in overlapping relation to the upper edge of the bottom panel 17. In this connection, it should also be noted that the bend 33 in the panel 16 causes the lower edge of the panel 16 to be flexed inwardly, while the bend 33 in the panel 17 causes the lower edge thereof to be flexed outwardly. Thus, when both of the panels 16 and 17 are in raised position (Figure 5) the upturned portion on the lower edge of the bottom panel 17 will ride over the lower edge of the upper panel 16, thus preventing damage to the fur of the animals which might be caused by scraping against the lower edge of the panel 16. In a like manner the flange 35 on the upper portion of the top panel 16 will prevent injury to the fur of the animals by riding over the sharp upper edge of the bottom panel 17 when both of the panels are in lowered position (Figure 6).

It will thus be seen that when the panels 16 and 17 are in lowered position (Figure 6), that the flange 35 will provide an effective barrier against escape of the baby animals into the associated cage, and at the same time will permit the mother to climb over the lowered panels. The portion 36 of the flange 35 prevents damage to the fur of the mother.

The flange 35 has diametrically opposed triangular slots 40 (Figure 9) positioned forwardly of the panel 16 and spaced therefrom so as to permit the outturned portion of the L-shaped flange 32 to ride therein as the panel 16 is being either elevated or depressed in the channel 31. In this connection, it should be noted that the triangular slots 40 are positioned forwardly of the vertical portion of the panel 16 a sufficient distance so that the flex in the panel 16 caused by the bend 33 therein will cause the forwardly projecting flange 35 of the panel 16 to ride inwardly over the L-shaped flange 32 when the panel 16 is elevated to its topmost position. Thus, as shown in Figure 9, the under surface of the flange 35 will engage the upper end of the flange 32, thus locking the panel 16 in elevated position. In order to lower the panel it is necessary to raise the hinged top 15 and to push outwardly on the flange 35 until the triangular slots 40 are alined with the outturned portions of the flange 32, thereby permitting the panel 16 to be lowered to a desired position.

The nesting box is provided with a floor 42, which is rectangular in plan and is formed from any suitable foraminated material, such as wire mesh or the like. The edges of the foraminated material are bound by a frame 43 which is U-shaped in cross-section and is preferably formed of sheet metal.

The lower edge of the front wall 10 is turned inwardly to form a flange 41 and the upper edge of the fixed rear panel 18 is turned inwardly to form a flange 48, said flanges 41 and 48 serving as upper retaining means whereby the floor 42 is maintained in proper parallel spaced relation to the top panel 14.

The under surface of the floor 42 is supported by respective upper legs of a pair of longitudinally extending channel-shaped members 44 and 45 secured to the inner surfaces of side walls 11 and 12 respectively. The floor 42 is slidably removable from the box by sliding it forwardly on said upper legs of the channel-shaped members 44 and 45.

The side walls 11 and 12 extend downwardly below the channel-shaped members 44 and 45 a substantial distance and the lower ends of the respective side walls are turned inwardly to form flanges 46 and 47. It will thus be seen that substantially channel-shaped guides are formed by the under surfaces of the lower legs of the channel-shaped members 44 and 45, the inenr surfaces of the walls 11 and 12 and the upper surfaces of the flanges 46 and 47, into which channel-shaped guides a suitable cleaning tray 50 may be slidably positioned.

The cleaning tray 50 is formed of any suitable material such as sheet metal and has upturned flanges 51 extending around the outer periphery thereof. It will be observed that the channel-shaped members 44 and 45 serve as spacers to maintain the cleaning tray 50 in parallel spaced relation to the foraminated floor 42, thus eliminating the danger of the animals' feet being caught between sections of the foraminated floor 42 and the upturned flange 51 of the cleaning tray 50 as the cleaning tray is slid from the box. A relatively wide flat metal strip 52 extends transversely across the front of the cleaning tray 50, said strip 52 being fixedly secured to the front of the cleaning tray 50 by any suitable means, such as welding or the like. The lower portion of the strip 52 serves as a handle for the cleaning tray 50 and the upper vertically extending portion of the strip 52 serves in conjunction with a slide fastener 53 as locking means for the cleaning tray 50 and also for the foraminated floor 42. The slide fastener 53 is slidably mounted in a bracket 54 fixedly secured to the outer surface of the front panel 10 adjacent the lower edge thereof. It will be observed in Figure 11 that the latch 53 is normally in lowered position so as to normally lock the cleaning tray 50 and the floor 42. When it is desired to remove the cleaning tray 50 and/or the floor 42 the latch 53 may be elevated within the confines of the bracket 54 to a point where it is no longer in contact with the strip 52, thus enabling the cleaning tray 50 to be removed.

The rearmost portion of the fixed top panel 14 is turned downwardly to form a flange 60 and the rear panel 18 extends a substantial distance beneath the floor of the cleaning tray 50. Thus the lower portion of the rear panel 18 and the portion 60 form flanges which are adapted to fit within corresponding flanges of an animal cage. Thus, the nesting box may be readily installed or removed from the animal cage merely by setting the flange 60 and the lower portion of the rear panel 18 in the corresponding flanges on the animal cage.

It is thus seen that we have provided a nesting box adapted to be used in conjunction with an animal cage, which nesting box has the features of sliding panels on the rear portion thereof adjacent the cage, which panels are adjustable so as to enable the animals to enter the nesting cage without the risk of causing damage to the fur either before or after the birth of a litter of baby animals, and which nesting box affords maximum protection to both the mother and her young in that it has sliding panels forming the ingress to the box from the cage, said panels being designed to prevent damage to the fur of the mother and at the same time serving to prevent the babies from leaving their nesting box.

When the mother animal is heavy with young the panels 16 and 17 may be maintained in raised position so that the mother will not have to climb a barrier in moving from the nesting box into the cage. After the young are born, the panels are lowered and serve to keep the young animals within the nesting box while permitting the mother to climb over the flange 35 into the cage. The panels may be completely closed when it is desired to remove the nesting box with animals therein.

The provision of the cleaning tray being spaced from the floor of the nesting box affords additional protection to the animals in that heretofore there has been danger of injury to the feet of the animals when the cleaning tray is removed.

In the drawings and specification there has been set forth a preferred embodiment of the invention and although specific terms are employed, they are used in a generic and descriptive sense only, and not for purposes of limitation, the scope of the invention being defined in the claims.

We claim:

1. A nesting box for an animal cage comprising a front wall, two spaced side walls, a top, a rear wall comprising at least two vertically slidable panels, a floor spaced from said top, guide means on the side walls for slidably receiving said panels, means for maintaining said panels in any desired position, at least one of said panels being positioned rearwardly of the other panels within the guide means and said rearwardly positioned panel having a flange extending forwardly within the box substantially beyond the other panels, said flange having slots adapted to mate with said guide means, one of said panels being positioned forwardly of the other panels within the guide means and said forwardly positioned panel having a rearwardly extending upturned lower end portion adapted to ride over the lower ends of the other panels.

2. A nesting box for an animal cage comprising a front wall, two spaced side walls, a rigid top portion and a hinged top portion, a rear wall comprising upper and lower vertically slidable panels, a floor spaced from said top portion, a cleaning tray spaced from said floor, guide means on each of the side walls for slidably receiving said panels, each of said panels being flexed so as to frictionally engage the guide means for maintaining said panels in any desired position, the upper panel being positioned rearwardly of the lower panel within the guide means and having a flange on the upper end thereof, said flange projecting forwardly within the box and having slots normally disposed out of alinement with the guide means but adapted to mate with said guide means to permit vertical movement of the upper panel, the lower panel being positioned forwardly of the upper panel within the guide means and having a rearwardly extending upturned lower end portion forming a groove adapted to receive the lower end of the upper panel.

3. A detachable nesting box for an animal cage comprising a front wall, two spaced side walls, a top, a rear wall comprising upper and lower vertically slidable panels, a floor spaced from said top, channel-shaped guides on each of the side walls for slidably receiving said panels, said panels being flexed intermediate their ends so as to frictionally engage said channel-shaped guides for maintaining said panels in any desired position, the upper panel being positioned rearwardly of the lower panel within the guides and having a forwardly projecting flange extending within the box substantially beyond the guides, said flange having slots normally disposed out of alinement with said guides but adapted to mate with said guides to permit vertical movement of the upper panel, the upper ends of said guides being spaced from the upper ends of the side walls whereby, upon the upper panel being moved to its uppermost position, the slots in the flange thereof will move out of engagement with said guides for securing the upper panel in raised position.

4. In an animal cage having a floor and a sidewall provided with an opening adjacent the floor, a nesting box including a vertically movable telescopic wall receivable in said opening, corresponding and mating flanges fixed to the cage and the nesting box adjacent the upper and lower edges of the opening and the movable wall respectively for releasably attaching the nesting box to the cage, said nesting box also including a top, sidewalls and a floor, opposed vertically extending guide members secured to the inner surfaces of said sidewalls, each of said guide members including an inner flange and an outer flange and the inner flange of each guide member terminating at a point spaced beneath the top, said vertically movable telescopic wall including upper and lower partially overlapping movable wall portions formed of bendable sheet material slidably mounted in the guide members, said upper and lower movable wall portions each extending approximately half the distance between the top and the floor and being movable to selectively define an opening and a wall adjacent the floor of the box, said upper and lower wall portions being creased transversely intermediate their ends to flex the wall portions into frictional engagement with both flanges of each guide member, and a flange extending inwardly within the nesting box from the upper edge of said upper movable wall portion, said flange having a pair of opposed slots communicating with the edges thereof adjacent said side walls and spaced inwardly from the juncture of the flange with the upper wall portion, said slots being selectively movable into and out of alinement with the inner flanges of the guide members, whereby said movable wall may be positively locked in elevated position.

5. In an animal cage having an opening, a nesting box including a vertically movable telescopic wall receivable in said opening, said nesting box also including a top, sidewalls and a floor, opposed vertically extending guide members secured to the inner surfaces of said sidewalls, each of said guide members including an inner flange and an outer flange, said vertically movable telescopic wall including upper and lower wall portions formed of bendable sheet material arranged in partially overlapping relation between the inner and outer flanges of said guide members, said upper and lower wall portions each being of a height slightly greater than one-half the distance between said top and said floor and said wall portions being movable apart from each other to span the distance between the top and the floor, said upper portion being engageable with the top of the box and said lower portion being engageable with the floor of the box, said wall portions being movable to selectively define an opening and a wall adjacent the floor of the box, and said upper and lower wall portions being creased transversely intermediate their ends to flex said wall portions into tight frictional engagement with both flanges of each guide member.

6. In an animal cage having an opening, a nesting box including a vertically movable telescopic wall receivable in said opening, said nesting box also including a top, sidewalls and a floor, opposed vertically extending guide members secured to the inner surfaces of said sidewalls, each of said guide members including an inner flange and an outer flange, said vertically movable telescopic wall including upper and lower wall portions formed of bendable sheet material arranged in partially overlapping relation between the inner and outer flanges of said guide members, said upper and lower wall portions each being of a height slightly greater than one-half the distance between said top and said floor and said wall portions being movable apart from each other to span the distance between the top and the floor, said upper portion being engageable with the top of the box and said lower portion being engageable with the floor of the box, and said wall portions being movable to selectively define an opening and a wall adjacent the floor of the box.

References Cited in the file of this patent

UNITED STATES PATENTS

| | | |
|---|---|---|
| 1,139,849 | Collins | May 18, 1915 |
| 1,296,388 | Harris | May 4, 1919 |
| 1,552,325 | Loving | Sept. 1, 1925 |
| 2,655,129 | Miller | Oct. 13, 1953 |